United States Patent
Koike et al.

(10) Patent No.: US 7,604,413 B2
(45) Date of Patent: Oct. 20, 2009

(54) WHEEL SUPPORT BEARING ASSEMBLY WITH BUILT-IN LOAD SENSOR

(75) Inventors: Takashi Koike, Iwata (JP); Tomomi Ishikawa, Iwata (JP)

(73) Assignee: NTN Corporation, Osaka (JP)

( * ) Notice: Subject to any disclaimer, the term of this patent is extended or adjusted under 35 U.S.C. 154(b) by 407 days.

(21) Appl. No.: 11/630,504

(22) PCT Filed: Jun. 14, 2005

(86) PCT No.: PCT/JP2005/010823

§ 371 (c)(1),
(2), (4) Date: Dec. 21, 2006

(87) PCT Pub. No.: WO2006/001190

PCT Pub. Date: Jan. 5, 2006

(65) Prior Publication Data

US 2008/0285901 A1    Nov. 20, 2008

(30) Foreign Application Priority Data

Jun. 25, 2004  (JP) ............................. 2004-187530

(51) Int. Cl.
*F16C 41/04* (2006.01)
*F16C 19/08* (2006.01)
*G01P 3/42* (2006.01)
(52) U.S. Cl. .................... 384/448; 384/548; 324/173
(58) Field of Classification Search ......... 384/446–448, 384/544, 548; 324/173–174, 207.18, 207.25
See application file for complete search history.

(56) References Cited

U.S. PATENT DOCUMENTS 6,688,770 B1 * 2/2004 Schottdorf et al. .......... 384/446

| 6,916,118 B2 * | 7/2005 | Ito ............................. 384/448 |
| 2002/0097040 A1 | 7/2002 | Takizawa et al. |
| 2005/0016296 A1 | 1/2005 | Inoue |

(Continued)

FOREIGN PATENT DOCUMENTS

DE    10258937 A1 *    7/2004

(Continued)

OTHER PUBLICATIONS

International Search Report issued in International Application No. PCT/JP2005/010823 mailed on Aug. 30, 2005 (3 pages, with translation).

(Continued)

*Primary Examiner*—Marcus Charles
(74) *Attorney, Agent, or Firm*—Osha • Liang LLP

(57) ABSTRACT

A wheel support bearing assembly comprises a stationary outer member and a rotatable inner member. The to-be-detected parts of angle detection sensors are fixed to the inner member and an outer race of a constant velocity joint connected to the inner member, respectively. Detecting parts of the angle detection sensors are fixed to the outer member in face-to-face relation with the to-be-detected parts. The bearing assembly also includes a load conversion unit detecting a relative angular difference between the inner member and the constant velocity universal joint by comparing the detection signals from the detecting parts to detect the load acting on the bearing assembly.

13 Claims, 12 Drawing Sheets

U.S. PATENT DOCUMENTS

2005/0140357 A1    6/2005   Takizawa et al.
2006/0108170 A1 *  5/2006   Ishikawa et al. ............ 384/448

FOREIGN PATENT DOCUMENTS

| JP | 07239204   A * | 9/1995  |
|----|----------------|---------|
| JP | 2002-340922    | 11/2002 |
| JP | 2003-207402    | 7/2003  |
| JP | 2003247858 A * | 9/2003  |
| JP | 2003-336652    | 11/2003 |
| JP | 2004-19934     | 1/2004  |
| JP | 2004-332809    | 11/2004 |
| JP | 2005-257471 A *| 9/2005  |
| SU | 1633261    A1 *| 3/1991  |
| WO | WO 2006049145 A1 * | 5/2006 |

OTHER PUBLICATIONS

Patent Abstracts of Japan, Publication No. 2003-336652 dated Nov. 28, 2003 (2 pages).
Patent Abstracts of Japan, Publication No. 2004-019934 dated Jan. 22, 2004 (2 pages).
U.S. Appl. No. 10/555,733, filed Nov. 7, 2005 (not yet published); Corresponds to BC above.
Patent Abstracts of Japan, Publication No. 2002-340922 dated Nov. 27, 2002 (2 pages).
Patent Abstracts of Japan, Publication No. 2003-207402 dated Jul. 25, 2003 (2 pages).
Patent Abstracts of Japan, Publication No. 2004-332809 dated Nov. 25, 2004 (2 pages).

* cited by examiner

WHEEL SUPPORT BEARING ASSEMBLY WITH BUILT-IN LOAD SENSOR

FIELD OF THE INVENTION

The present invention relates to a wheel support bearing assembly with a built-in load sensor for detecting a load acting on a bearing portion of the wheel.

BACKGROUND ART

Hitherto, a wheel support bearing assembly having a sensor for detecting the rotational speed of each of wheels for safe travel of an automotive vehicle is known. In such a wheel support bearing assembly, it is suggested to install a sensor such as a temperature sensor, torque sensor or a vibration sensor for detecting other information useful for the operation of an automotive vehicle than the rotational speed. (See, for example, the Japanese Laid-open Patent Publications No. 2002-340922 (Patent Document 1) and No. 2003-207402 (Patent Document 2).) In the wheel support bearing assembly disclosed in the Patent Document 1, a to-be-detected part of a rotation sensor is disposed between two rows of raceway surfaces defined on an outer peripheral surface of a rotatable inner member and, at the same time, a detecting part of the rotation sensor for detecting the rotation of the to-be-detected part is provided on a stationary outer member in face-to-face relation with the to-be-detected part. In the wheel support bearing assembly disclosed in the Patent Document 2, a piezoelectric element and a coil forming a to-be-detected part of a torque sensor is provided between two rows of raceway surfaces on an outer peripheral surface of a rotatable inner member, and a detecting part of the torque sensor is provided on a stationary outer member. This detecting part is of a type capable of detecting magnetic fields generated in the coil because of a potential difference, when the piezoelectric element generates the potential difference consequent upon displacement resulting from torsion of an inner race of the inner member.

DISCLOSURE OF THE INVENTION

The automobile traveling safety precaution is hitherto generally taken by detecting the rotational speed of a wheel, but it is not sufficient with only the rotational speed of the wheel and, therefore, it is required to achieve a control for safety purpose with the use of other sensor signals. In view of this, it may be contemplated to achieve an attitude control based on a load acting on each of wheels during travel of an automotive vehicle. By way of example, a large load acts on the outside wheels during the cornering, on the wheels on one side during the run along left and right inclined road surfaces or on the front wheels during the braking, and, thus, a varying load acts on the vehicle wheels. Also, even in the case of the uneven live load, the loads acting on the wheels tend to become uneven. For this reason, if the loads acting on the wheels can be detected as needed, suspension systems for the vehicle wheels can be controlled beforehand based on results of detection of the loads so that the attitude control of the automotive vehicle during the traveling thereof (for example, prevention of a rolling motion during the cornering, prevention of downward settling of the front wheels during the braking, and prevention of downward settling of the vehicle wheels brought about by an uneven distribution of live loads) can be accomplished. However, no space for installation of the load sensor for detecting the load acting on the respective vehicle wheel is available and, therefore, the attitude control through the detection of the load can hardly be realized.

Also, considering that the steer-by-wire system in which the drive axle and the steering wheel are not coupled mechanically with each other will be increasingly used in the near future, information on the road surface come to be required to transmit to the steering wheel hold by a driver by detecting a load acting in the longitudinal direction of the drive axle.

Also, in the wheel support bearing assembly having a torque sensor built therein such as disclosed in the Patent Document 2, the effect by the spline connection used in connecting the bearing assembly with a constant velocity universal joint is not mentioned. In the Patent Document 2, the sensor for detecting a torque is arranged between the two rows of the raceway surfaces on the outer peripheral surface of the inner member and splines are provided on an inner peripheral surface of the inner member corresponding to the position of the torque sensor. The drive force from the engine is transmitted to the wheel support bearing assembly through the constant velocity universal joint, and the spline connection is generally employed for connecting the constant velocity universal joint and the wheel support bearing assembly. Once the spline connection loosens, the hysteresis of the torque output increases. Also, the splines provided in the constant velocity universal joint are formed to incline or twist at an angle of a few degree in order to reduce the loosening. When the splines provided in the constant velocity universal joint engage with the splines provided in the wheel support bearing assembly, the loosening of the spline connection can be reduced by the inclined splines. In the event of the torque transmission in a direction matching with the direction in which the splines are inclined, the strain is induced in the to-be-detected part of the sensor in proportion to the torque. However, in the case of the torque transmission in a reverse direction, the strain acts in a direction in which the twist may lessen, and the torque is not accurately transmitted to the to-be-detected portion of the sensor, resulting in reduction in sensitivity of the sensor and linearity of the sensor output. Also, the spline connection has a contact portion which is instable and depending on the situation, the torque is not transmitted to the torque sensor.

An object of the present invention is intended to solve those problems and to provide a wheel support bearing assembly with a built-in load sensor capable of accurately detecting a load on a wheel without being affected by the connection, for example, the spline connection between the bearing assembly and an outer race of a constant velocity universal joint and also enabling the compact installation of the load sensor on a vehicle.

A wheel support bearing assembly with a built-in load sensor according to the present invention is a bearing assembly for rotatably supporting a wheel relative to a vehicle body and includes an outer member having an inner peripheral surface formed with double rows of raceway surfaces, an inner member having an outer peripheral surface formed with double rows of raceway surfaces in face-to-face relation with the double rows of the raceway surfaces of the outer member, and double rows of rolling elements interposed between those raceway surfaces of the outer and inner members. The wheel support bearing assembly also includes a first angle detecting sensor having a to-be-detected part provided in the inner member and a corresponding detecting part provided in the outer member in face-to-face relation with the to-be-detected part provided in the inner member, a second angle detecting sensor having a to-be-detected part provided in an outer race of a constant velocity universal joint that is coupled with the inner member and a corresponding detecting part provided in the outer member in face-to-face relation with the to-bedetected part provided in the outer race, and a load conversion unit for comparing respective detection signals from the detecting parts of the first and second angle detecting sensors to detect a relative angular difference between the inner member and the constant velocity universal joint to thereby detect a load acting on the wheel support bearing assembly.

According to this construction, while the to-be-detected parts of the first and second angle detecting sensors are arranged in the inner member and the outer race of the constant velocity universal joint, the relative angular difference between the inner member and the outer race is detected by comparing the detected signals from the detecting parts. The load conversion unit detects the load acting on the wheel support bearing assembly from the detected angular difference. Because of this, without being influenced in the wheel support bearing assembly by the spline connection of the inner member with the outer race of the constant velocity universal joint which transmits a drive force of an engine, the torque detection can be accomplished precisely. If the torque can be detected, conversion of the detected torque to a load acting on the drive axle in a traveling direction of a vehicle is possible. Also, since in the present invention the load is detected from the relative angular difference between the inner member and the outer race, the load sensor can be installed compactly on the automotive vehicle.

In the present invention, each of the first and second angle detecting sensors may be a wound-type sensor in which the detecting part has a coil winding and the to-be-detected part is made of a magnetic member having a plurality of circumferentially arranged indentations. For the circumferentially arranged indentations, the magnetic member, for example, may be rendered to be polygonal.

If the to-be-detected part is comprised of the magnetic member having the circumferentially arranged indentations, the combination of the to-be-detected part with a wound-type sensor increases the angle resolving power to permit a detection with high sensitivity.

In the present invention, each of the detecting parts of the first and second angle detecting sensors may be a magnetic sensor capable of providing an analog output, and each of the to-be-detected parts of the first and second angle detecting sensors may be a magnetic encoder magnetized to have alternating N and S poles.

If the magnetic encoder is used as the to-be-detected part, the magnetic sensor of a simple structure, for example, a Hall element or a magnetic resistance element can be employed.

In the present invention, one of the two angle detecting sensors may be used to output a signal for controlling an anti-lock brake system.

In the case of this construction, the angle detecting sensor used for the control of the anti-lock brake system can be concurrently used for the detection of the load. As compared with the separate use of sensors for the detection of the rotational speed and the detection of the load, the number of component parts and the number of manufacturing steps can be reduced and the structure of the sensor can be simplified and, therefore, the cost thereof can be reduced.

In the present invention, each of the to-be-detected parts may include a ring having windows cyclically defined therein. Those rings are spaced a predetermined gap therebetween in a radial direction and arranged in such a manner that the windows of those rings do not overlap with each other. The detecting part provided in the outer member in opposed relation with each of the to-be-detected parts includes a coil winding.

In the case of this construction, since the rings having the rows of the windows cyclically defined therein are used as the to-be-detected parts, the angle detecting sensors can be simplified in structure and the manufacture thereof can be eased.

In the present invention, each of the rings has two rows of the windows. Those rings are so arranged that an area of opening of the windows of one row becomes small while an area of opening of the windows of the other row becomes large when a torque is applied to the wheel support bearing assembly, in which case the load conversion unit detects the load by calculating a differential output of respective changes in magnetic resistances of the rings detected by the corresponding detecting parts.

Even in the case of this construction, since each of the rings having the two rows of the windows defined therein is used as the to-be-detected part, the structure of the angle detecting sensor can be simplified and the manufacture thereof can be eased. Also, the system, in which the load is detected based on the amount of opening of the windows resulting from the torque, is effective to accomplish the detection with high sensitivity since the torque can be assuredly transmitted between the outer race and the inner member.

In the present invention, in place of the ring, a plurality of indentations may be formed as the to-be-detected part directly in a surface of one of the inner member and the outer race of the constant velocity universal joint, whereas the ring having the windows may then be secured to a surface of the other of the inner member and the outer race.

Direct formation of those indentations is effective to reduce the number of component parts and the number of assembling steps.

In the present invention, respective portions of the inner member and the outer race which contact with each other may have the same outer diameter. A plurality of indentations defining the to-be-detected part may be provided in each of the contact portions. The indentations on the inner member and the indentations on the outer race contact with each other while aligned out of phase with each other. In this case, one of the detecting parts of the first and second angle detecting sensors provided in the outer member in opposed relation with the indentations on the inner member and the indentations on the outer race is formed by a coil winding. The angle detecting sensor detects a change in relative phase between the indentations on the inner member and the indentations on the outer race as a change in magnetic resistance of the coil winding of the corresponding detecting part when the torque is applied to the wheel support bearing assembly.

In the case of this construction, since the change in relative phase between the indentations on the inner member and the indentations on the outer race resulting from the action of the torque is detected as a change in magnetic resistance of the coil winding of the corresponding detecting part, the detection with high sensitivity can be accomplished with high precision.

In the present invention, a coil winding may be additionally provided as the other of the detecting parts in the outer member so as to confront with a rotating portion of the outer race, where no indentation is formed. By so doing, a differential output of changes in magnetic resistances of those coil windings forming the detecting parts can be detected.

In the case of this construction, by detecting the rotating portion where no indentation is formed, the temperature compensation can be achieved.

Where the indentations, which define the to-be-detected part are provided as described above, the inner member may include a hub axle having a wheel mounting flange and an inner race mounted on an outer peripheral surface of the hub axle. The inner race is axially fixed to the hub axle by means of a staked portion provided in an inboard end portion of the hub axle. In this case, ring members, each having indentations arranged circumferentially thereof at one face thereof, are secured respectively to the inner race and the outer race with the indentations of the ring members opposed to each other, or circumferentially arranged indentations are formed directly in each of the inner race and the outer race with those indentations of the inner race and the outer race opposed to each other, and an end face of the outer race of the constant velocity universal joint and the staked portion in the hub axle are lightly contacted with each other under slight pressure or a gap is provided therebetween.

In this case, since the end face of the outer race and the staked portion of the hub axle do not contact with each other or are held in light contact, the phase difference can easily be developed when the torque acts, and, therefore, increase of the sensitivity and reduction of the hysteresis can be expected.

In the case of this construction, a spacer may be arranged between a free end of a stem portion of the outer race of the constant velocity universal joint and a washer secured to the outboard side of the hub axle, and the outer race and the hub axle may then be bolted together through a threaded hole defined in a free end face of the stem portion with the washer and the spacer intervened and a gap may be provided between the staked portion and the end face of the outer race.

In the present invention, the stem portion of the outer race may have a length smaller than an outboard end of a center bore of the inner member, in which the stem portion of the outer race engages. In this case, a threaded hole is defined in a free end face of the stem portion and, by threading a bolt into the threaded hole through a washer contacting a portion of the inner member around the threaded hole, the stem portion of the outer race and the inner member are connected together.

In the case of this construction, when the load acts, the phase difference can easily be developed between the inner member and the outer race and, therefore, the load detecting sensitivity can be increased.

In the present invention, the stem portion of the outer race may have a length smaller than an outboard end of a center bore of the inner member, in which the stem portion of the outer race engages and, on the other hand, a threaded hole may be defined in a free end face of the stem portion. By threading a bolt into the threaded hole while a cylindrical flange of a cylindrically flanged washer is inserted into the center bore of the inner member with its free end held in contact with a free end of the stem portion, the stem portion of the outer race and the inner member can be connected together.

Even in the case of this construction, when the load acts, the phase difference can easily be developed between the inner member and the outer race and, therefore, the load detecting sensitivity can be increased.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

The first preferred embodiment of the present invention will be described with particular reference to FIGS. 1 to 4. A wheel support bearing assembly with a built-in load sensor according to the first embodiment is applied to a third-generation wheel support bearing assembly of an inner race rotating type that is used to support a drive wheel. It is to be noted that the terms "inboard" and "outboard" represent the sides facing the inside and the outside, respectively.

Figure 1:
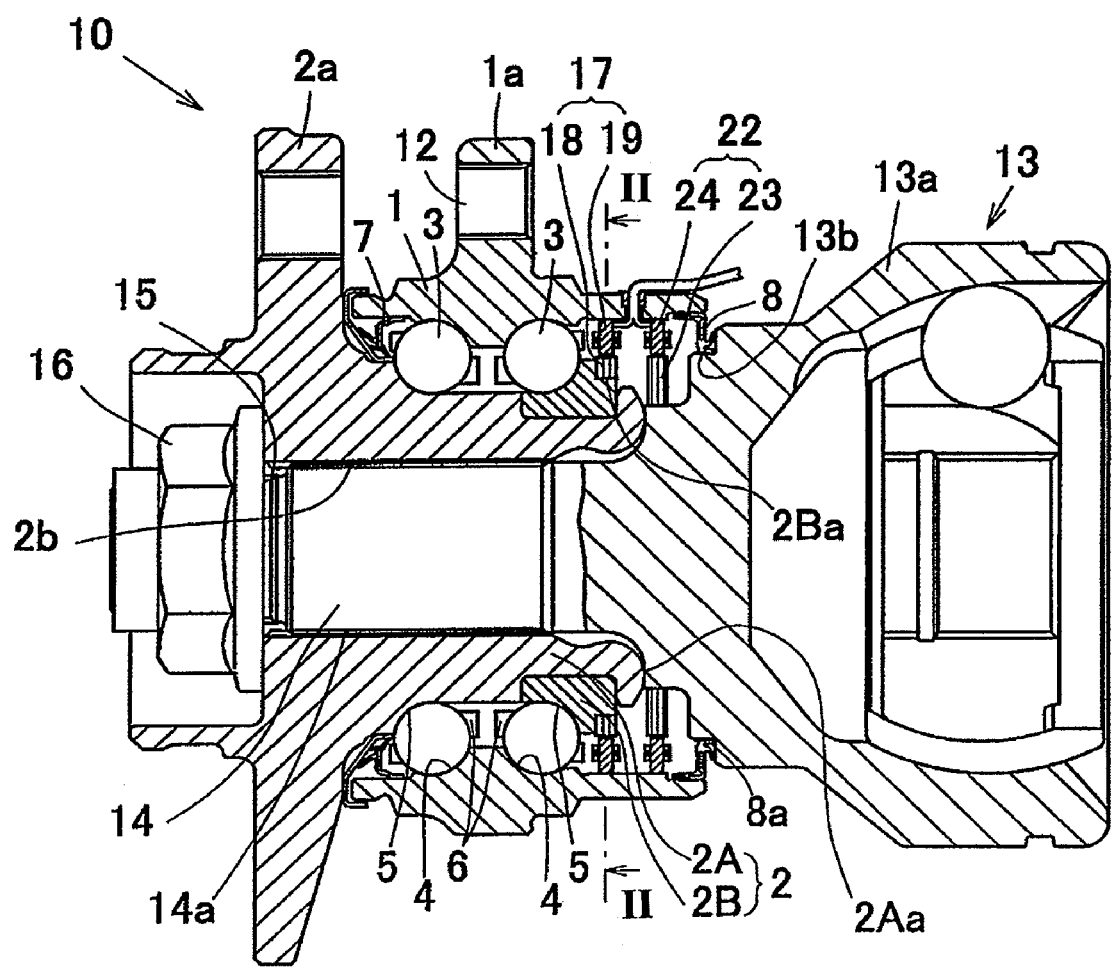
FIG. 1 is a sectional view of a wheel support bearing assembly with a built-in load sensor according to a first preferred embodiment of the present invention.

Referring to FIG. 1, the wheel support bearing assembly 10 includes an outer member 1 having an inner peripheral surface formed with double rows of raceway surfaces 4, an inner member 2 having an outer peripheral surface formed with double rows of raceway surfaces 5 confronting those raceway surfaces 4, and double rows of rolling elements 3 interposed between those double rows of the raceway surfaces 4 and 5. This wheel support bearing assembly 10 is a double row angular contact ball bearing. Each of the raceway surfaces 4 and 5 is of an arcuate shape in section and the raceway surfaces 4 and 5 are so formed as to have respective contact angles held in back-to-back relation with each other. The rolling elements 3 are in the form of a ball and are retained by a retainer 6 employed for each row of those rolling elements 3.

The outer member 1 serves as a stationary member and is, as shown in FIG. 1, of a one-piece member having an outer peripheral surface formed with a vehicle body fitting flange 1a that is to be secured to a knuckle (not shown). The vehicle body fitting flange 1a is fastened to the knuckle, installed on a vehicle body (not shown), by means of bolts (not shown) at a plurality of circumferential locations. Mounting holes 12 in the vehicle body fitting flange 1a are threaded. The bolts extend through respective throughholes defined in the knuckle with male thread portions at free ends of the bolts threadingly engaged in the associated mounting holes 12. It is to be noted that instead of the mounting holes 12 being an internally threaded hole, they may be a mere hole, through which the respective bolt is passed so that such bolt can be fastened with a nut.

The inner member 2 serves as a rotatable member and is made up of a hub axle 2A, having an outer peripheral surface formed with a wheel mounting flange 2a, and an inner race 2B that is a separate member mounted on an outer peripheral surface of the hub axle 2A on the inboard side thereof. The double rows of the raceway surfaces 5 are formed on the hub axle 2A and the inner race 2B, respectively. A stem portion 14, that is formed integrally with an outer race 13a of the constant velocity universal joint, is inserted within a center bore of the hub axle 2A and the outer race 13a of the constant velocity universal joint 13 is coupled to the hub axle 2A by fastening a nut 16 onto a male thread portion 15a provided at a free end of the stem portion 14. The hub axle 2A has an inner peripheral surface formed with spline grooves 2b while the stem portion 14 has an outer peripheral surface formed with spline grooves 14a. The spline grooves 2b engage the spline grooves 14a to form spline connection between the hub axle 2A and the stem portion 14. The inner race 2B is axially fixed in position to the hub axle 2A by staking a portion 2Aa provided in an inboard end portion of the hub axle 2A. Outboard and inboard open ends of an annular bearing space formed between the inner and outer members 2 and 1 are sealed by associated contact-type seals 7 and 8, which are a sealing device. The inboard seal 8 secures a sealability on the inboard side by holding a lip portion 8a of the seal 8 in sliding contact with a stepped surface 13a provided in an outer peripheral surface of the outer race 13a.

An inboard end portion of the inner race 2B on the in board side of the raceway surface 5 on the outer periphery thereof is provided with a stepped surface 2Ba, in which a to-be-detected part 18 of a first rotational angle detecting sensor 17 is provided. At a position of the inner peripheral surface of the outer member 1 radially opposed to the to-be-detected part 18, a detecting part 19 of the first rotational angle detecting sensor 17 is provided. The to-be-detected part 18 and the detecting part 19 altogether form the first rotational angle detecting sensor 17. A cross-sectional view, taken along the line II-II in FIG. 1, of this first rotational angle detecting sensor 17 is shown in FIG. 2.

Figure 2:
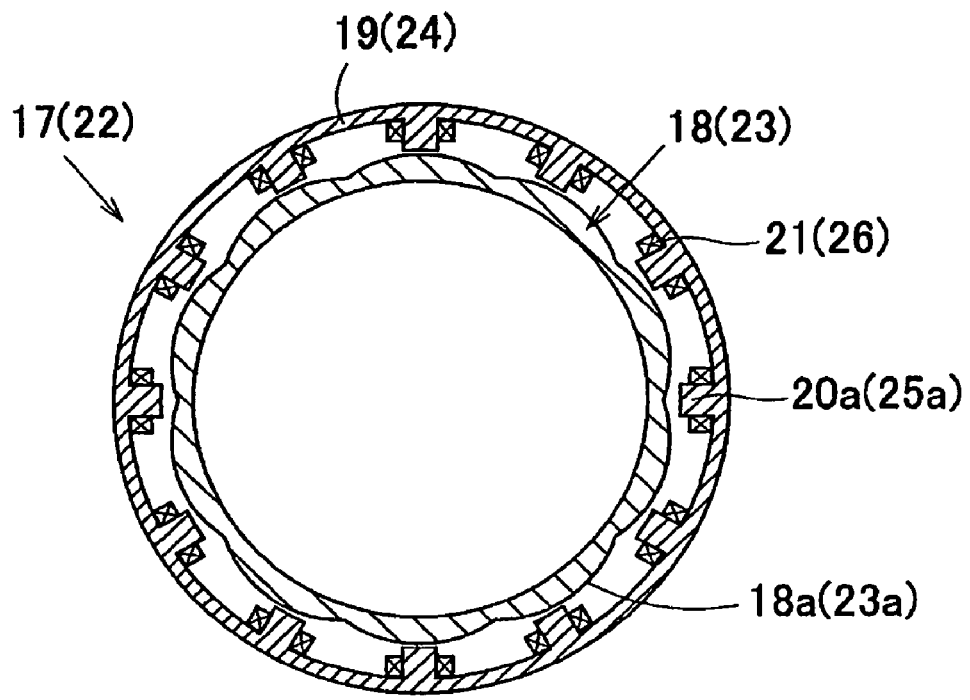
FIG. 2 is a sectional view of a rotational angle detecting sensor used in the wheel support bearing assembly of FIG. 1.
Figure 3:
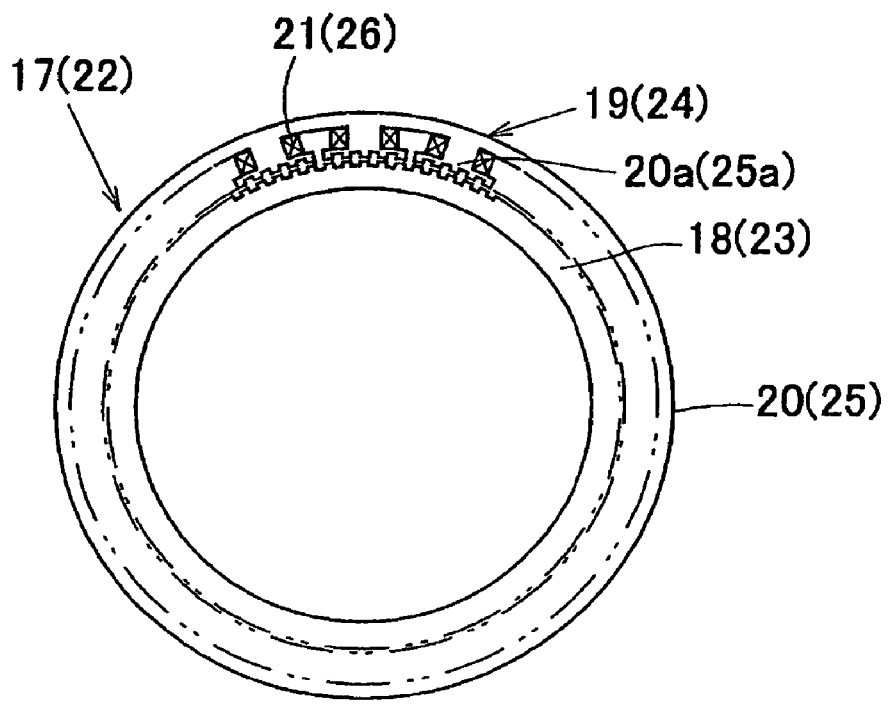
FIG. 3 is a sectional view showing another example of the rotational angle detecting sensor.

Referring now to FIG. 2, the to-be-detected part 18 is in the form of a rotor made of a ring-shaped magnetic member and having an outer peripheral surface that is so shaped as to be indented with a plurality of hill areas 18a arranged in a circumferential direction of the to-be-detected part 18 at a predetermined pitch. Each of the hill areas 18a is rendered to represent an arcuate shape in section in a direction perpendicular to an axial direction of the to-be-detected part 18. Each of the hill areas 18a may be squared. By way of example, the outer peripheral shape of the to-be-detected part 18 may be polygonal with each corner representing the corresponding hill area 18a.

The detecting part 19 is in the form of a stator including a ring-shaped magnetic member 20, in which inwardly oriented yokes 20a are arranged in a circumferential direction of the magnetic member at a predetermined pitch, and a coil winding 21 wound around each of the yokes 20a. The to-be-detected part 18 in the form of the rotor and the detecting part 19 in the form of the stator altogether form a resolver or the first rotational angle detecting sensor 17 which outputs an analog voltage.

A portion of the outer peripheral surface of the outer race 13a shown in FIG. 1 is provided with a to-be-detected part 23 of a second rotational angle detecting sensor 22 adjacent the inboard end face (the staked portion 2Aa in this embodiment) of the hub axle 2A which contacts the outer peripheral surface of the outer race 13a. A detecting part 24 of the second rotational angle detecting sensor 22 is provided at a portion of the inner peripheral surface of the outer member 1, which is radially opposed to the to-be-detected part 23. The to-be-detected part 23 and the detecting part 24 altogether form the second rotational angle detecting sensor 22. This second rotational angle detecting sensor 22 is of the same construction as the first rotational angle detecting sensor 17. In other words, as shown in FIG. 2 by the reference numerals depicted along with those of the first angle detecting sensor 17, the to-be-detected part 23 is in the form of a rotor made of a ring-shaped magnetic member and having an outer peripheral surface that is so shaped as to be, for example, polygonal with a plurality of hill areas 23a arranged in a circumferential direction of the to-be-detected part 23 at a predetermined pitch. The detecting part 24 is in the form of a stator including a ring-shaped magnetic member 25, in which inwardly oriented yokes 25a are arranged in a circumferential direction of the magnetic member 25 at a predetermined pitch, and a coil winding 26 wound around each of the yokes 26a. The to-be-detected part 23 in the form of the rotor and the detecting part 24 in the form of the stator altogether form a resolver which serves as the second rotational angle detecting sensor 22.

Figure 4:
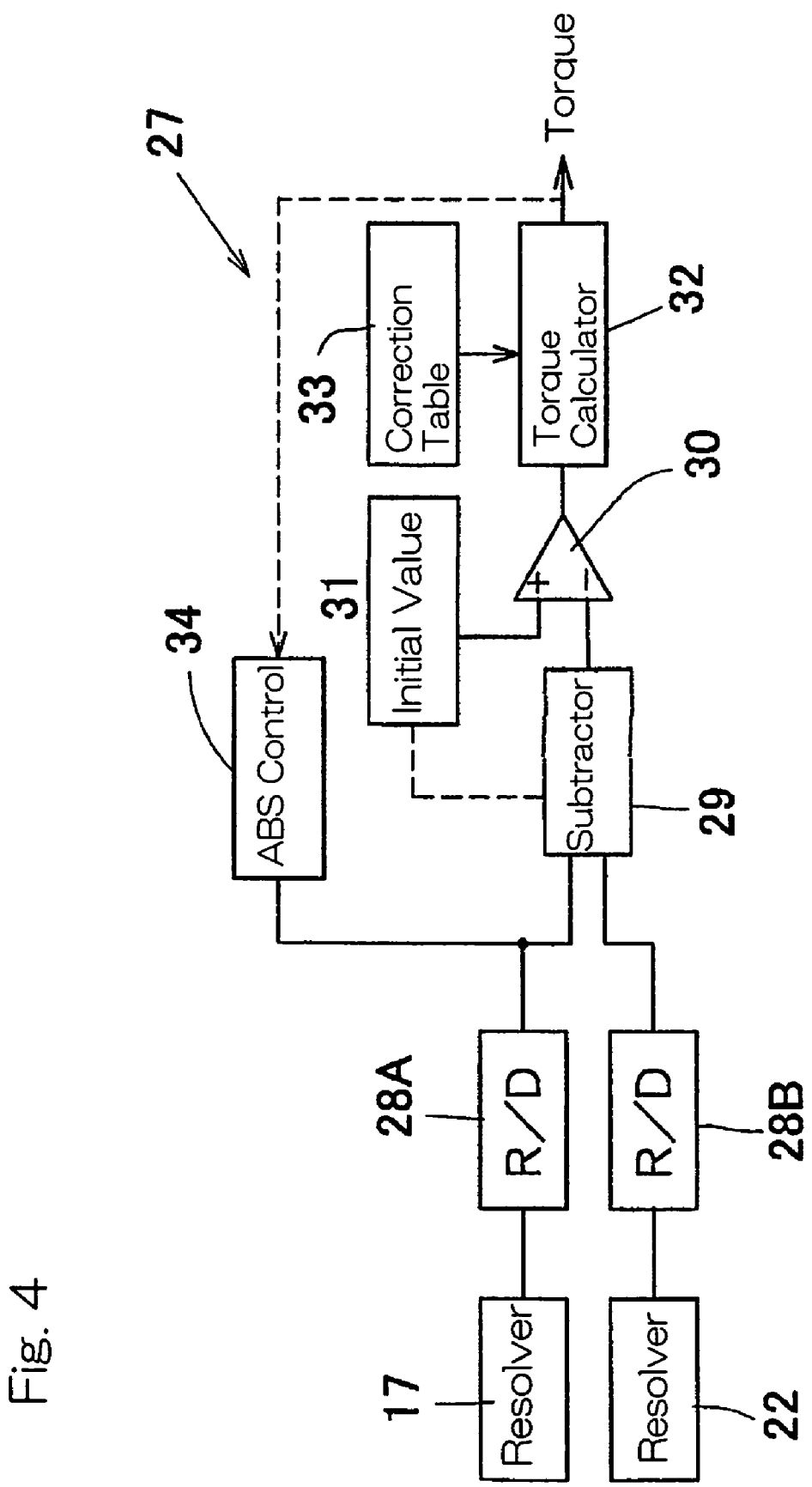
FIG. 4 is a schematic diagram of a load conversion unit used in the wheel support bearing assembly of FIG. 1.

The vehicle body to which the outer member 1 shown in FIG. 1 is fitted is, as shown in a block diagram in FIG. 4, provided with a load conversion unit 27 for detecting a load, acting on the wheel support bearing assembly 10, with the use of respective detection signals of the first and second rotational angle detecting sensors 17 and 22. This load conversion unit 27 includes a pair of R/D (resolver to digital) converters 28A and 28B for converting the detection signals (outputs of the detecting parts 19 and 24) of the resolvers 17 and 22 into respective digital signals, a subtractor 29 for calculating a relative angular difference of two angular signals, which have been digitally converted, a comparator 30 for comparing the calculated angular difference with an initial value 31, which is a predetermined reference value, and a torque calculator 32 for calculating the load based on the result of the comparison in the comparator 30 and data of a correction table 33. The calculated load value is supplied to an ABS control device 34, mounted on the vehicle body, and is used as data for the ABS control. The ABS is an abbreviation of the anti-lock brake system.

The load conversion unit 27 operates in the following manner. Respective angle signals detected by the detecting parts 19 and 24 of the first and second rotational angle detecting sensors 17 and 22 are converted into digital signals by the corresponding R/D converters 28A and 28B and those two angle signals so converted are subtracted by the subtractor 29.

In this way, a relative angular difference between the inner member 2 and the outer race 13a of the constant velocity universal joint 13 is calculated. The angle difference so calculated is compared by the comparator 30 with the initial value 31. The initial value 31 in this case is a result of subtraction performed by the subtractor 29 during a condition, in which no load has acted on the wheel support bearing assembly 10 (for example, during the parking or the straight run at a low velocity). As a result of the comparison performed by the comparator 30, a phase difference (angle difference) resulting from a twist between the outer race 13a and the inner race 2B can be obtained. In the torque calculator 32, based on the data of the correction table 33, the load acting on the wheel support bearing assembly 10 can be calculated from the phase difference.

It is to be noted that since the phase difference resulting from the twist between the outer race 13a and the inner race 2B depends on the rigidity, but is so small as to be 1 degree at most, the phase difference can be detected with high precision if the number of poles provided in each of the first and second angle detecting sensors 17 and 22, that is, the number of the hill areas 18a or 23a of the corresponding to-be-detected parts 18 or 23 and the yokes 19a or 24a of the corresponding detecting parts 19 or 24 is as large as possible. In view of this, as shown in another structural example in FIG. 3, it is preferred that each of the first and second rotational angle detecting sensors 17 and 22 has so large a number of the poles as to have an increased resolving power. It is also to be noted that if an axial gap is provided between the outer race 13a of the constant velocity universal joint 13 and the staked portion 2Aa as described later with reference to FIG. 18, the phase difference can easily be obtained and the hysteresis can be reduced.

As described above, since this wheel support bearing assembly 10 with the built-in load sensor for detecting the load acting on the wheel support bearing assembly 10 is provided with the first rotational angle detecting sensor 17 having the to-be-detected part 18 provided in the inner race 2B, the second rotational angle detecting sensor 22 having the to-be-detected part 23 provided in the outer race 13a, and the load conversion unit 27 (FIG. 4) for detecting the load acting on the wheel support bearing assembly 10 by comparing the respective detection signals of those rotational angle detecting sensors 17 and 22 to thereby detect the relative angular difference between the inner race 2B and the outer race 13a, the load sensor can be installed compactly on an automotive vehicle and the load acting on the wheel can be stably and accurately detected without the sensor output being affected by the spline connection between the outer race 13a and the wheel support bearing assembly 10. Also, the load so detected can be converted into load acting in a traveling direction of the vehicle on the drive axle. Also, since the rotational angle detecting sensors 17 and 22 are used as a load sensor, the rotational speed of the wheel can be detected.

Figures 5A, 5B:
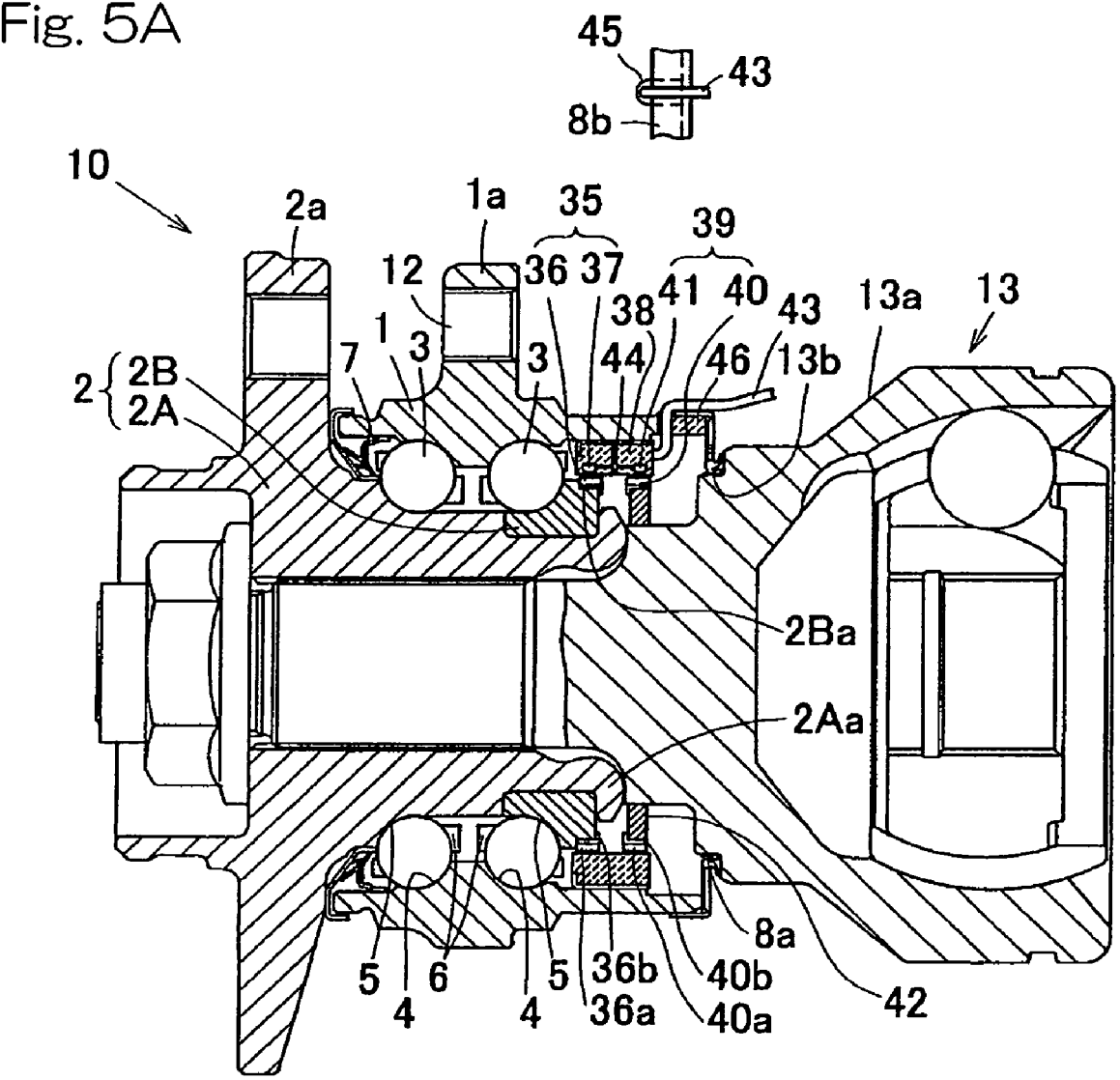
FIG. 5A is a sectional view of the wheel support bearing assembly with the built-in load sensor according to a second preferred embodiment of the present invention.
FIG. 5B is a fragmentary plan view of the wheel support bearing assembly of FIG. 5B.
Figure 6:
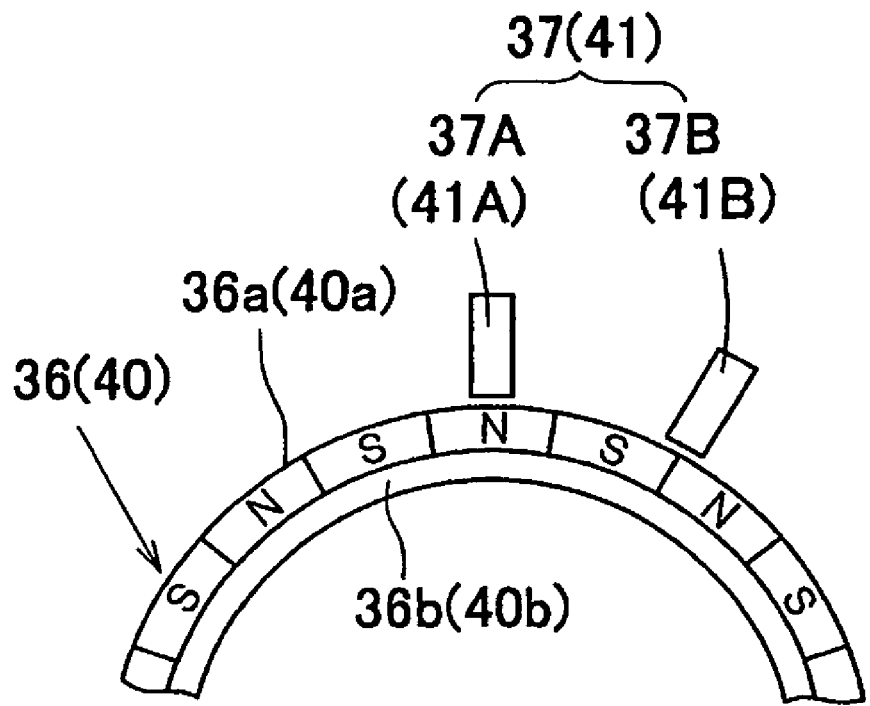
FIG. 6 is a fragmentary front elevational view showing a schematic structure of the rotational angle detecting sensor used in the wheel support bearing assembly of FIG. 5A.

FIGS. 5A and 5B to FIG. 8 illustrate a second preferred embodiment of the present invention. This wheel support bearing assembly 10 with the built-in load sensor is such that in place of the two rotational angle detecting sensors 17 and 22 which are used as resolvers in the first embodiment shown in FIG. 1, two rotational angle detecting sensors 35 and 39, each made up of a combination of a magnetic encoder and a magnetic sensor, are employed as shown in FIG. 5(A). Specifically, a to-be-detected part 36 of the first rotational angle detecting sensor 35 is a ring-shaped magnetic encoder having magnetic poles N and S magnetized alternately in a circumferential direction as schematically shown in FIG. 6, the magnetic characteristic of which varies in a plurality of cycles for each complete rotation of the inner member 1. This to-be-detected part 36 is an annular member of a radial type having its magnetic characteristic continuously varying in a circumferential direction relative to a detecting part 37 of the first rotational angle detecting sensor 35. More specifically, the to-be-detected part 36 includes an annular backing metal 36b and a magnetic member 36a provided on an outer peripheral surface of the backing metal 36b and having the alternating magnetic poles N and S magnetized in the circumferential direction thereof. This to-be-detected part 36 is firmly press-fitted in the stepped surface 2Ba in the outer peripheral surface of the inner race 2B through the backing metal 36b.

Figure 7:
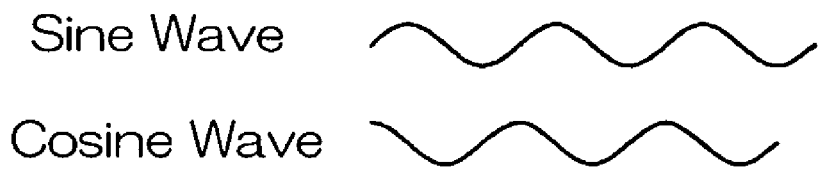
FIG. 7 is a diagram of output waveforms of the rotational angle detecting sensor.

The detecting part 37 of the first rotational angle detecting sensor 35, which is provided on the inner peripheral surface of the outer member 1 confronting radially the to-be-detected part 36 is a magnetic sensor capable of providing an analog output, such as, for example, a Hall IC or an MR element. The detecting part 37 is provided within a ring-shaped housing 38 having an outer side made of a core metal and an inner side made of resin as shown in FIG. 5A. As shown in FIG. 6, the detecting part 37 is made up of two sensors (37A and 37B), which are circumferentially spacedly arranged relative to the to-be-detected part 36 so that the output phase thereof may be offset 90° relative to each other. FIG. 7 illustrates respective waveforms of the two detecting parts 37A and 37B, one of which is outputted as a sine wave and the other of which is outputted as a cosine wave.

A portion of the outer peripheral surface of the outer race 13a shown in FIG. 5A is provided with a to-be-detected part 40 of the second rotational angle detecting sensor 39 adjacent the inboard end face (the staked portion 2Aa in this second embodiment) of the hub axle 2A which contacts the outer peripheral surface of the outer race 13a. A detecting part 41 of the second rotational angle detecting sensor 39 is provided at a portion of the inner peripheral surface of the outer member 1 radially opposed to the to-be-detected part 40. The to-be-detected part 40 and the detecting part 41 altogether form the second rotational angle detecting sensor 39. Even this second rotational angle detecting sensor 39 is of the same construction as the first rotational angle detecting sensor 35. Specifically, as shown in FIG. 6 by the reference numerals depicted along with those of the first rotational angle detecting sensor 35, the to-be-detected part 40 is a magnetic encoder including an annular backing metal 40b and a magnetic member 40a provided on an outer peripheral surface of the backing metal 40b and having alternating magnetic poles N and S magnetized in the circumferential direction thereof. This to-be-detected part 40 is firmly press-fitted onto a spacer 42, press-fitted onto the outer race 13a, through the backing metal 40b as shown in FIG. 5A. The detecting part 41 is provided on the inner peripheral surface of the outer member 1 confronting radially the to-be-detected part 40. This detecting part 41 is a magnetic sensor capable of providing an analog output, such as, for example, a Hall IC or an MR element and, as shown in FIG. 6, is made up of two sensors (41A and 41B), which are circumferentially spacedly arranged relative to the to-be-detected part 40 so that the output phase thereof may be offset 90° relative to each other. Even this detecting part 41 is provided within the housing 38.

For the magnetic members 36a and 40a of the to-be-detected parts 36 and 40 of the respective rotational angle detecting sensors 35 and 39, a rubber magnet containing, for example, a powdery magnetic material mixed in a matrix of rubber, is utilized and is fixed to the respective backing metal 36b or 40b by means of, for example, vulcanization. Each of the magnetic members 36a and 40a may be in the form of a plastic magnet or a sintered magnet, in which case the use of the backing metal is not always essential and may therefore be dispensed with. As a powdery magnetic material kneaded with rubber, ferrite or rare earth material is generally used.

A cable 43 extending from the detecting parts 37 and 41 is, as shown in FIG. 5A, drawn to the outside from the housing 38, in which the respective detecting parts 37 and 41 of the rotational angle detecting sensors 35 and 39 are provided. In this case, the cable 43 may be connected directly with respective terminals of the magnetic sensors 37 and 41, or may extend via a substrate 44 as shown in FIG. 5A. As shown in a plan view in FIG. 5B, when, after the cable 43 has been aligned at a position of a U-shaped cutout 45 provided in an inboard end of the outer member 1, the housing 38 is press-fitted in the inner peripheral surface of the outer member 1, the detecting parts 37 and 41 can be easily fitted to the outer member 1 without being interfered with the cable 43. It is to be noted that in order to seal the U-shaped cutout 45, an elastic member 46 (for example, a rubber material) of a shape conforming to the shape of the U-shaped cutout 45 is, after the cable 43 has been passed through the elastic member 46, inserted into the U-shaped cutout 45.

In order to enhance the sealability of the U-shaped cutout 45, it may be accomplished by using a bonding agent or a thermal bonding such as a fusion bonding. After this treatment, an annular metal ring 8b (FIG. 5B) of the seal 8 is press-fitted onto the outer peripheral surface of the outer member 1. In this way, the metal ring 8b partly overlaps the U-shaped cutout 45 and, therefore, the water proofing property of the U-shaped cutout 45 can be increased. Also, if the elastic member 46 has a thickness enough to allow its surface to protrude from the outer peripheral surface of the outer member 1, the water proofing effect can further be increased. As an additional water proofing measure, an elastic member such as rubber may be intervened so as to cover the entire circumference of a portion of contact between the metal ring 8b of the seal 8 and the outer member 1. It is to be noted that the manner of drawing the cable 43 and the sealing method are not always limited to those described above.

Figure 8:
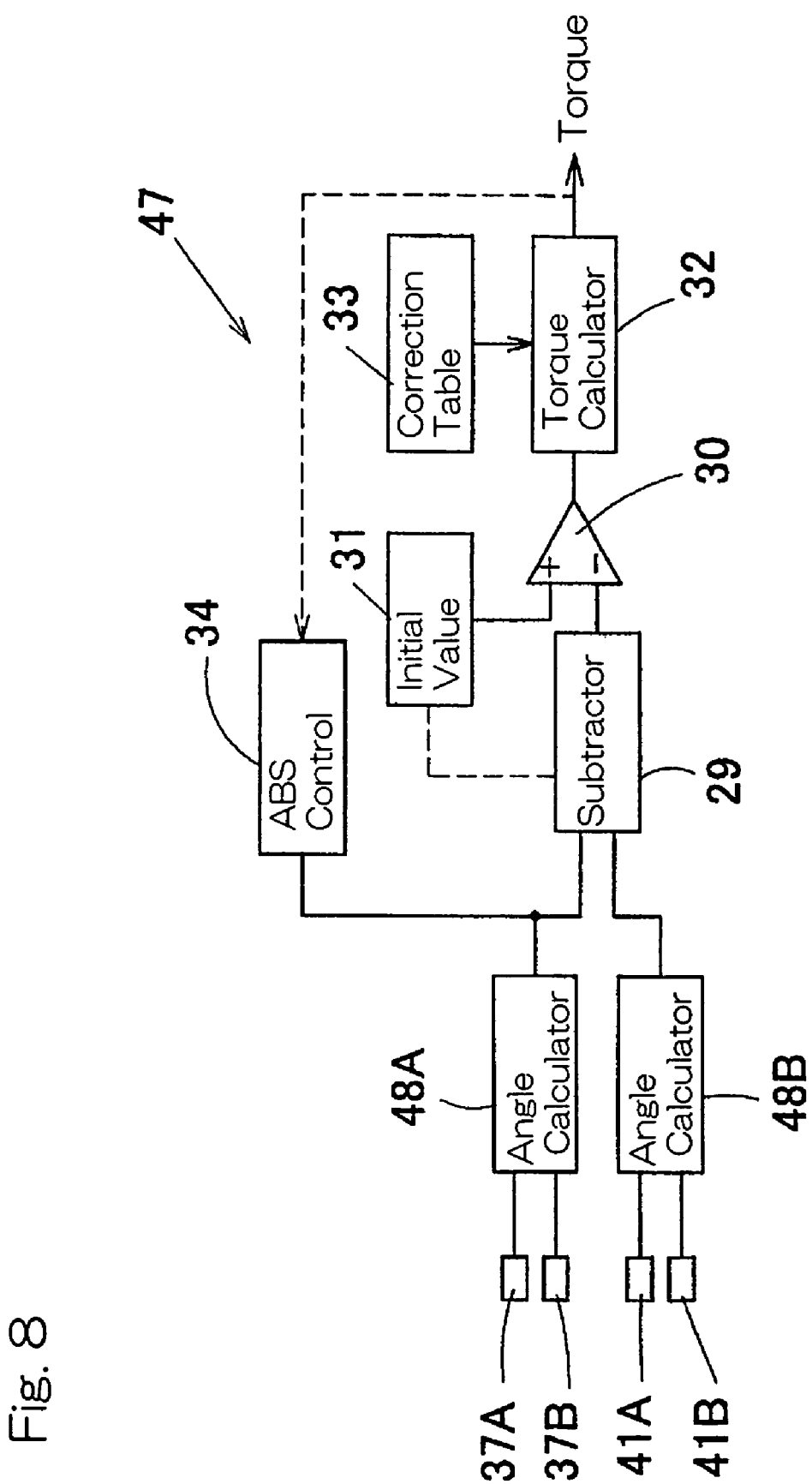
FIG. 8 is a schematic diagram of the load conversion unit used in the wheel support bearing assembly of FIG. 5A.

The vehicle body to which the outer member 1 is fitted is, as shown in a block diagram in FIG. 8, provided with a load conversion unit 47 for detecting a load acting on the wheel support bearing assembly 10 with the use of respective detection signals of the rotational angle detecting sensors 35 and 39. This load conversion unit 47 is of a structure substantially similar to the load conversion unit 27 (FIG. 4) employed in the first embodiment, but differs therefrom in that in place of the R/D converters 28A and 28B, angle calculators 48A and 48B are employed. The angle calculators 48A and 48B are inputted respectively with an angular signal indicative of the 90° phase difference outputted from the detecting parts 37A and 37B and an angular signal indicative of the 90° phase difference outputted from the detecting parts (41A and 41B) to detect an absolute position in the 360° electric angle in reference to this inputted angular signal. The subsequent processing is similar to that performed in the first embodiment described above. In other words, the two angular signals processed respectively by the angle calculators 48A and 48B are subtracted by the subtractor 29.

If the result of subtraction given out during the condition, in which no load has acted on the wheel support bearing assembly 10, for example, during the parking or the straight run at a low velocity, is used as an initial value 31 and the difference between the result of subtraction, obtained from the subsequent operating condition in which the load acts on the wheel support bearing assembly, and the initial value 31 is obtained by the comparator 30, the phase difference resulting from a twist between the outer member 1 and the hub axle 2A can be detected. From this phase difference, the torque calculator 32 calculates the torque based on a correction value of the correction table 33. While in this second embodiment, the detecting part 37 is employed in the form of a magnetic sensor capable of providing an analog output, the relative angular difference may be determined with the use of a magnetic sensor capable of providing a rectangular output if the resolving power is sufficient. Also, it is to be noted that if a gap is provided between the outer race 13a of the constant velocity universal joint 13 and the staked portion 2Aa as described later with reference to FIG. 18, the phase difference can easily be obtained.

Figure 9:
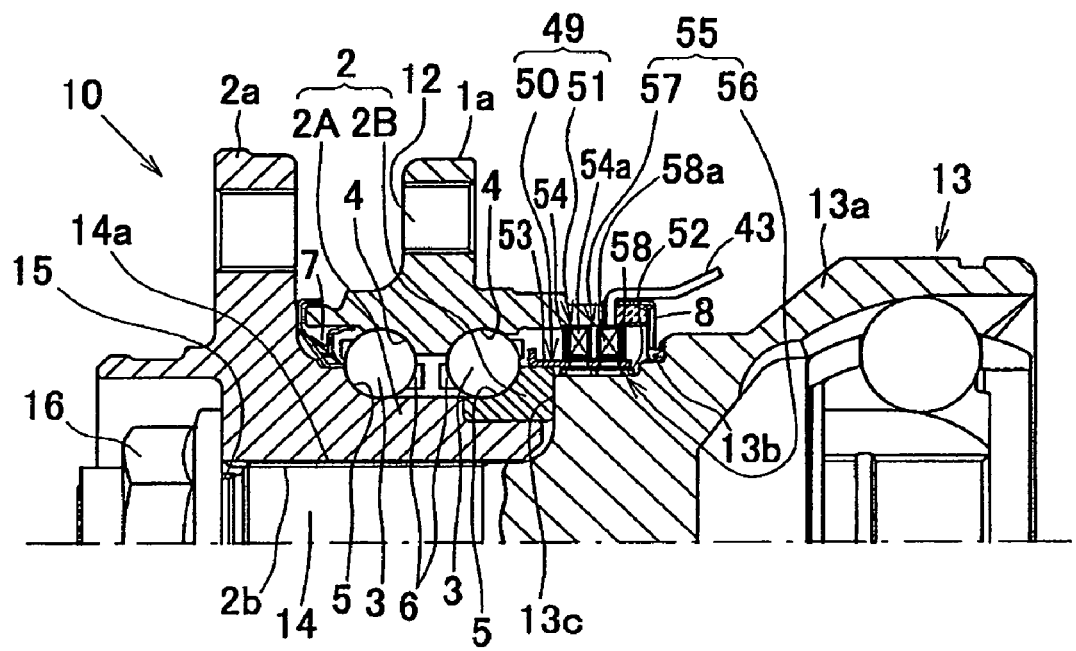
FIG. 9 is a sectional view of the wheel support bearing assembly with the built-in load sensor according to a third preferred embodiment of the present invention.
Figure 10:
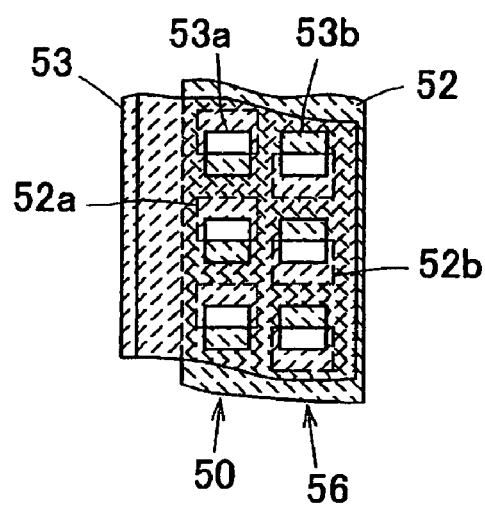
FIG. 10 is a fragmentary, enlarged plan view of a pulsar ring used in the wheel support bearing assembly of FIG. 9.
Figure 11:
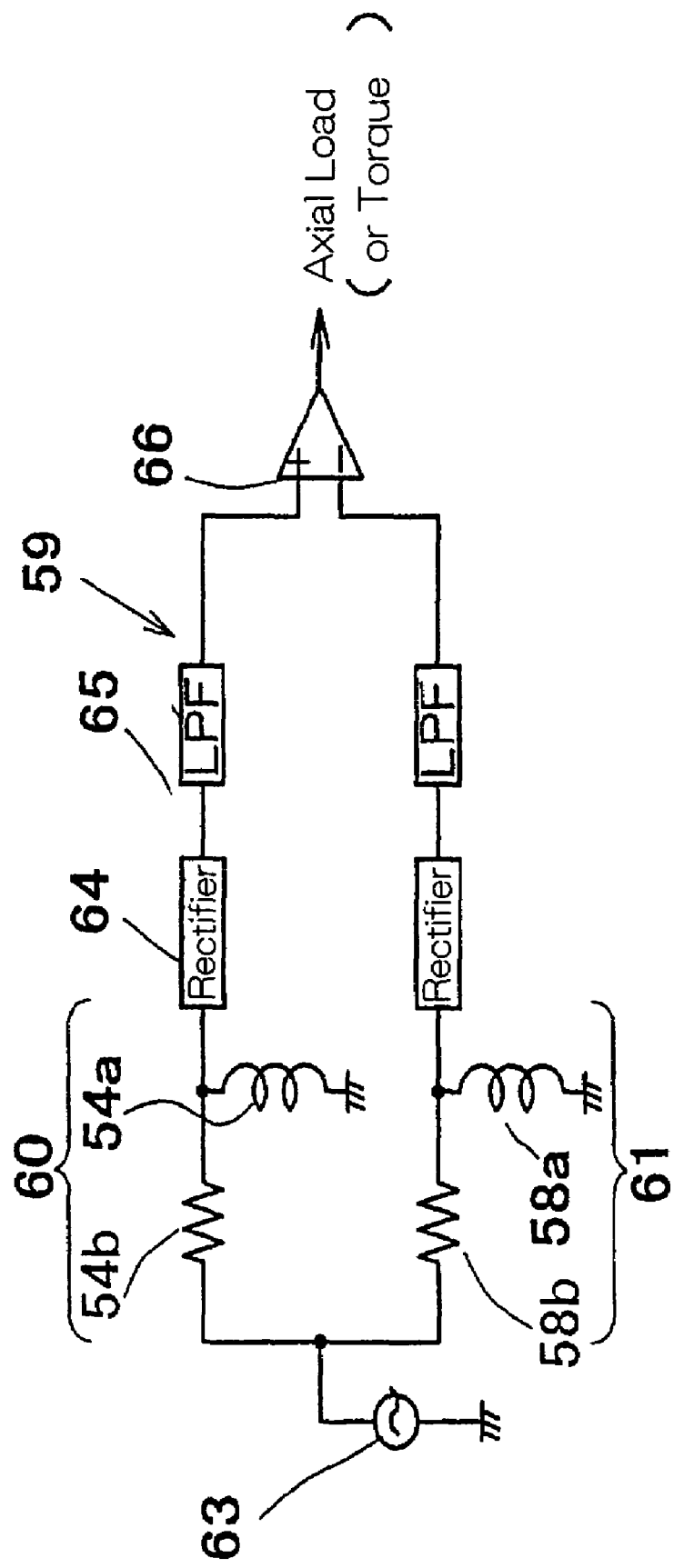
FIG. 11 is a schematic diagram of the load conversion unit used in the wheel support bearing assembly of FIG. 9.

FIGS. 9 to 11 illustrate a third preferred embodiment of the present invention. This wheel support bearing assembly 10 with the built-in load sensor is such that in place of the two rotational angle detecting sensors 35 and 39 each made up of a combination of the magnetic encoder and the magnetic sensor in the second embodiment shown in FIGS. 5A and 5B, two rotational angle detecting sensors 49 and 55 each made up of a combination of a pulsar ring and a coil winding are utilized. In this third embodiment, a detected part 50 of the first rotational angle detecting sensor 49 is in the form of a pulsar ring including a first ring 52 and a second ring 53. The first ring 52 is press-fitted on a portion of the outer peripheral surface of the outer race 13a adjacent the inboard side of a contact portion of the outer peripheral surface of the outer race 13a with the inner race 2B. The second ring 53 is press-fitted on the outer peripheral surface of the inboard end portion of the inner race 2B so as to extend over the first ring 52 in overlapping relation. A minute radial gap is maintained between those rings 52 and 53.

Those pulsar rings 52 and 53 are shown in a fragmentary enlarged plan view in FIG. 10. As shown therein, the first ring 52 is perforated to define two rows of windows 52a and 52b arranged equidistantly in a circumferential direction thereof, and those rows of the windows 52a and 52b are offset relative to each other in the circumferential direction so as to have a 180° phase difference, that is, circumferentially offset a distance corresponding to one window 52a or 52b relative to each other. The second ring 53 is perforated to define two rows of windows 53a and 53b. The windows 53a and 53b are arranged in a circumferential direction of the second ring 53 the same distance as that of the windows 52a and 52b in the first ring 52, respectively and those rows of the windows 53a and 53b are phase matched with each other with the windows 53a and 53b axially aligned with each other. Also, those rings 52 and 53 have their circumferential positions so set that the row of the windows 52a and the row of the windows 53a are partly overlapped to allow a circumferential half of each window 53a to be left open and the other row of the windows 52b and the other row of the windows 53b are partly overlapped to allow a circumferential half of each window 53b (in a direction reverse to the circumferential direction in which each window 53a opens half) to be left open.

The rows of the windows 52a and the windows 53a of the first and second rings 52 and 53 which form the pulsar ring are rendered to be a to-be-detected part 50 of the first rotational angle detecting sensor 49. A detecting part 51 of the first rotational angle detecting sensor 49 is arranged at a portion of the inner peripheral surface of the outer member 1 radially opposed to the to-be-detected part 50. This detecting part 51 is made up of a ring-shaped yoke 54 having a coil winding 54a. This detecting part 51 and the to-be-detected part 50 altogether form the first rotational angle detecting sensor 49.

A to-be-detected part 56 of the second rotational angle detecting sensor 55 is formed by the rows of the windows 52b and the windows 53b of the first and second rings 52 and 53 which form the pulsar ring. A detecting part 57 of the second rotational angle detecting sensor 55 is arranged at a portion of the inner peripheral surface of the outer member 1 radially opposed to the to-be-detected part 56. This detecting part 57 is made up of a ring-shaped yoke 58 having a coil winding 58a. This detecting part 57 and the to-be-detected part 56 altogether form the second rotational angle detecting sensor 55. The coil windings 54a and 58a of the detecting parts 51 and 57 may be accommodated within the detecting parts 51 and 57, respectively, while being wound around a corresponding bobbin made of resin or the like. The structure in which a cable 43 is drawn out from the detecting parts 51 and 57, and a sealing structure of a portion of the outer member 1, at which the cable 43 is drawn outwardly, are identical with those used in the second embodiment shown and described with reference to FIGS. 5A and 5B. It is to be noted that in this third embodiment, the staked portion 2Aa at the inboard end portion of the hub axle 2A is dispensed with and the inner race 2B is axially fastened relative to an end face 13c of the outer race 13a at the boundary between the stem portion 14 and the outer race 13a and fixed to the hub axle 2A.

FIG. 11 illustrates a block diagram of a load conversion unit 59 for detecting the load acting on the wheel support bearing assembly 10 with the use of respective detection signals of the rotational angle detecting sensors 49 and 55. This load conversion unit 59 includes a first series-connected circuit 60 made up of the coil winding 54a of the detecting part 51 of the first rotational angle detecting sensor 49 and a resistor 54b, and a second series-connected circuit 61 made up of the coil winding 58a of the detecting part 57 of the second rotational angle detecting sensor 55 and a resistor 58b, which series-connected circuits 60 and 61 are connected parallel to each other. An alternating voltage of a few ten kHz is applied from an oscillator 63. A divided voltage across the first coil winding 54a is converted into a direct current voltage by a rectifier 64 and a low pass filter 65, which is in turn inputted to a first input terminal of a differential amplifier 66. Also, a divided voltage across the second coil winding 58a is also converted into a direct current voltage by a different rectifier 64 and a different low pass filter 65, which is in turn inputted to a second input terminal of the differential amplifier 66. The differential amplifier 66 is operable to amplify and then output a difference between those two inputs. It is to be noted that in place of the series-connected circuits 60 and 61, resonance circuits each including a capacitor and a coil winding 54a or 58a may be employed.

When a torque is applied to the inner member 2 and the outer race 13a of the constant velocity universal joint 13, the relative positions of the two rings 52 and 53 forming the pulsar ring displace in the circumferential direction. As a result thereof, the magnetic resistances at the to-be-detected parts 50 and 56 change depending upon the amount of opening of the windows 53a and 53b and, therefore, in the load conversion unit 59, the divided voltages across the coil windings 54a and 58a change. Signals obtained by processing those divided voltages by means of the rectifier 64 and the low pass filter 65 represent phase difference signals of the rotational angle detecting sensors 49 and 55, respectively.

Although in a condition, in which no torque acts on the wheel support bearing assembly 10, the two rings 52 and 53 forming the pulsar ring rotate with no phase change as compared with the initial condition, the phase difference is generated between the rings 52 and 53 as the torque acting on the wheel support bearing assembly 10 increases. As a result, the areas of opening of the windows 53a and 53b of the to-be-detected parts 50 and 56 in the pulsar ring change. The larger the amount of opening of the windows of one row, the smaller the amount of opening of the windows of the other row. The divided voltages across the coil windings 54a and 58a of the detecting parts 51 and 57 for detecting the magnetic resistance of those window rows change similarly and the difference therebetween is calculated and outputted from the differential amplifier 66. This output is descriptive of detection of the torque acting on the hub axle 2A and, in a manner similar to any one of the previously described embodiments, the load acting in the traveling direction on a tire can easily be calculated if the value of the torque and the radius of the tire are known.

The load conversion unit 59 may be mounted on a circuit substrate (not shown) provided on the outer member 1 or mounted on a circuit substrate (not shown) provided on the knuckle on the side of the vehicle body, or on a circuit substrate built in an ECU of an automotive vehicle. Also, the load information processed by the load conversion unit 59 may be transmitted wireless to a receiving unit provided in the vehicle body by a transmitting unit (not shown), in which case the supply of an electric power to the circuit substrate, on which the load conversion unit 59 is mounted, may be performed wireless.

Figure 12:
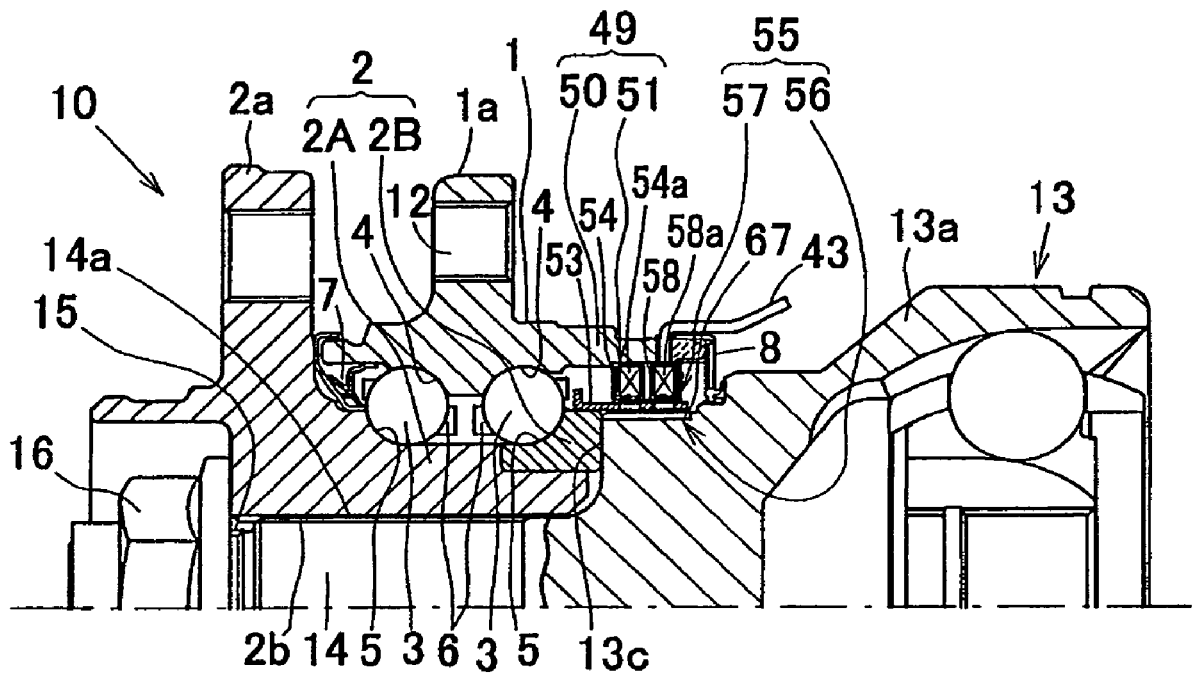
FIG. 12 is a sectional view of the wheel support bearing assembly with the built-in load sensor according to a fourth preferred embodiment of the present invention.
Figure 13:
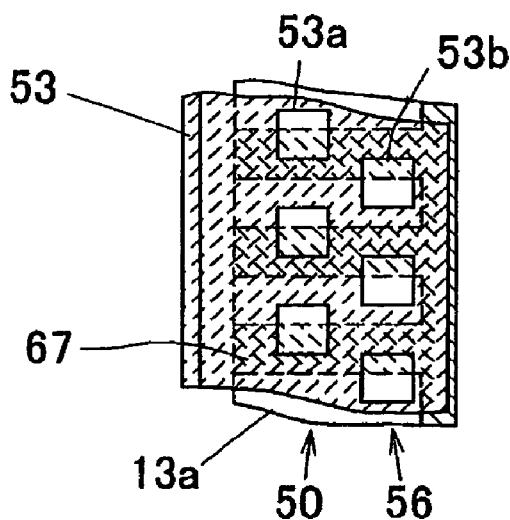
FIG. 13 is a fragmentary, enlarged plan view of the pulsar ring used in the wheel support bearing assembly of FIG. 12.

FIGS. 12 and 13 illustrate a fourth preferred embodiment of the present invention. This wheel support bearing assembly 10 with the built-in load sensor is such that in place of the ring 52 in the third embodiment shown in FIGS. 9 to 11, a plurality of indentations 67 corresponding in function to the windows 52a and 52b of the ring 52 are provided in a portion of the outer peripheral surface of the outer race 13a so as to confront the ring 53. In other words, as shown in FIG. 13 showing a fragmentary enlarged plan view of the pulsar ring, the outer peripheral surface of the outer race 13a is provided with a plurality of axially extending recesses 67 arranged equidistantly in the circumferential direction thereof. The ring 53 is perforated to define the two rows of the windows 53a and 53b. The windows 53a and 53b are arranged the same distance as that of the recesses 67 and those two rows of the windows 53a and 53b are circumferentially offset relative to each other a distance corresponding to one window so that the rows of the windows 53a and 53b may assume an inverted phase relation with each other. Also, the ring 53 has a circumferential position relative to the recesses 67 so set that only a circumferential half portion of each window 53a may be left open as the windows 53a of one row and the recesses of the indentations 67 are partly overlapped with each other and, on the other hand, a circumferential half portion of each window 53b (in a direction reverse to the circumferential direction in which each window 53a opens half) may be left open as the windows 53b of the other row and the recesses of the indentations 67 are partly overlapped with each other, with the magnetic resistance of window open portions in each window row reduced to a low value. Other structural features and functions of the load conversion unit 59 are identical with those in the third embodiment shown in and described with reference to FIGS. 9 to 11 and, therefore, the details thereof are not reiterated.

Figure 14:
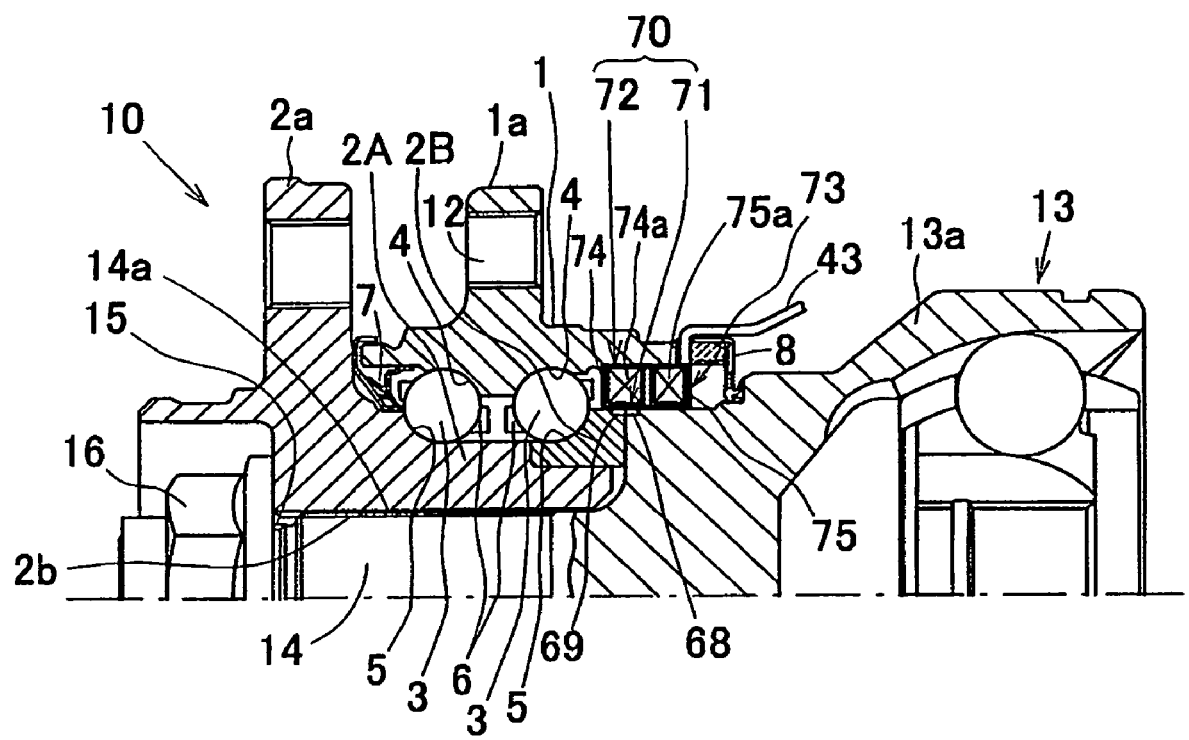
FIG. 14 is a sectional view of the wheel support bearing assembly with the built-in load sensor according to a fifth preferred embodiment of the present invention.
Figure 15:
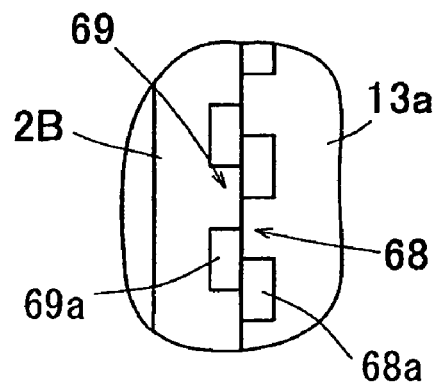
FIG. 15 is a fragmentary, enlarged plan view of a to-be-detected part used in the wheel support bearing assembly of FIG. 14.

FIGS. 14 and 15 illustrate a fifth preferred embodiment of the present invention. This wheel support bearing assembly 10 with the built-in load sensor is such that in place of the rings 52 and 52 forming the pulsar ring in the third embodiment shown in and described with reference to FIGS. 9 to 11, a plurality of indentations 68 and a plurality of indentations 69 are provided on the respective outer peripheral surfaces of the outer race 13a and the inner race 2B adjacent a boundary between the outer race 13a and the inner race 2B so that the indentations 68 and the indentations 69 confront with each other in contact relation, as shown in a fragmentary enlarged view in FIG. 15. The indentations 68 and the indentations 69 are spaced equally in circumferential directions of the outer race 13a and the inner race 2B, respectively. The inner race 2B and the outer race 13a have the same outer diameter adjacent the boundary.

The indentations 68 and 69 are so arranged that they are not in the same phase relation to each other. When a torque acts while the indentations 68 and the indentations 69 are in the same phase, a relative slip occurs between respective end faces of the inner race 2B and the outer race 13a depending on the magnitude of the torque, accompanied by change in phase of the indentations 68 and 69 and, accordingly, the circumferential range of axially confronting portions between projections 68a and 69a of the indentations 68 and the indentations 69.

A rotational angle detecting sensor 70 in the fifth embodiment includes a to-be-detected part 71 made up of the indentations 68 and 69 and a first detecting part 71 provided at a portion of the inner peripheral surface of the outer member 1 confronting the to-be-detected part 71. The detecting part 72 is made up of a yoke 74 having a coil winding 74a and is operable to detect a change of the magnetic resistance of the to-be-detected part 71. A second detecting part 73 is provided in the inner peripheral surface of the outer member 1 in axially adjoining relation with the detecting port 72. The detecting part 73 is arranged in opposition to a portion of the outer peripheral surface of the outer race 13, where no indentation 68 is provided. Even this second detecting part 73 is made up of a yoke 75 having a coil winding 75a.

The load conversion unit is of the same structure as that shown in FIG. 11 and the coil windings 74a and 75a are merely used instead of the coil windings 54a and 58a. When the load acts on the wheel support bearing assembly 10, the magnetic resistance changes as a result of change in relative phase between the indentations 68 and the indentations 69 of the to-be-detected part 71 and, therefore, a voltage proportional to the change of the load can be obtained from the winding 74a of the detecting part 72. In contrast thereto, the portion of the outer peripheral surface of the outer race 13a, where no indentation 68 is provided, does not show change in magnetic resistance even when the load acts on the wheel support bearing assembly 10 and, therefore, no change of the voltage proportional to the change of the load is obtained from the coil winding 75a of the detecting part 73, but an output from the detecting part 73 is used for temperature compensation purpose. Since no indentation is provided in the outer peripheral surface of the outer race 13a that is opposed to the coil winding 75a, the coil winding 75a differs from the coil winding 74a at the initial point in respect of the magnetic resistance, but the magnetic resistance of the coil winding 75a can be matched with that of the coil winding 74a by adjustment of the number of windings of the coil winding 75a, the width of the yoke or the size of an air gap between the detecting part 73 and the outer peripheral surface of the outer race 13a. It is to be noted that the coil winding 75a for temperature compensation purpose can be dispensed with. From a voltage difference between those coil windings 74a and 75a, the load acting on the wheel support bearing assembly 10 can be obtained.

Figure 16:
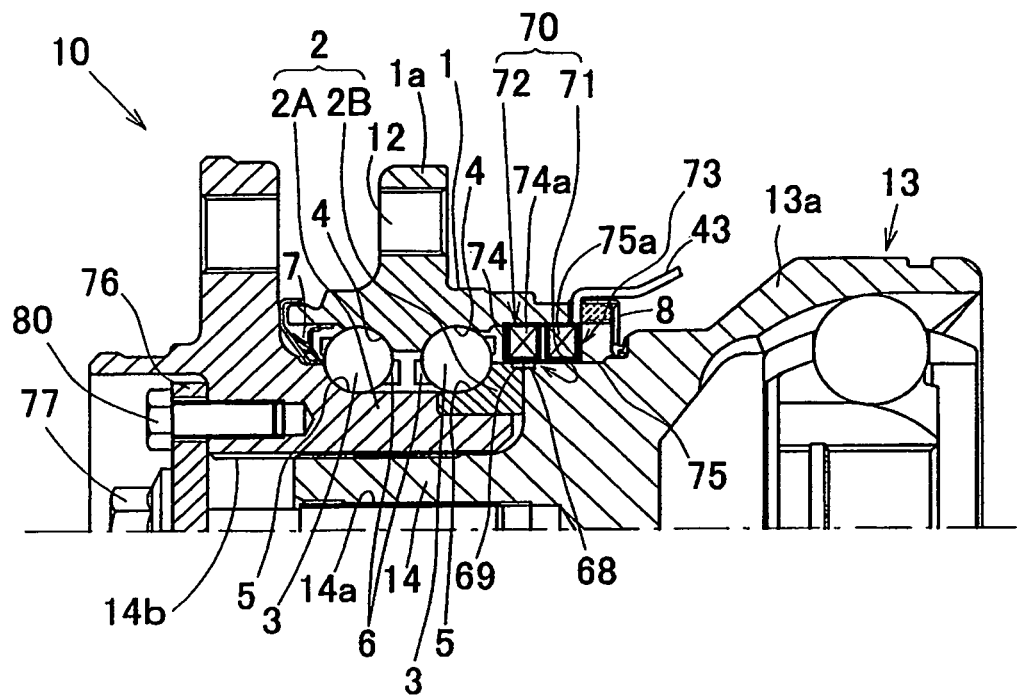
FIG. 16 is a sectional view of the wheel support bearing assembly with the built-in load sensor according to a sixth preferred embodiment of the present invention.

FIG. 16 illustrates a sixth preferred embodiment of the present invention. This wheel support bearing assembly 10 with the built-in load sensor differs from that of the fifth embodiment shown in and described with reference to FIGS. 14 and 15 in that the connecting system between the hub axle 2A and the outer race 13a of the constant velocity universal joint 13 is employed. In this wheel support bearing assembly 10, a stem portion 14 formed integrally with the outer race 13a is made shorter than a center bore of the hub axle 2A, and the outer race 13a is coupled with the hub axle 2A by threading a bolt 77 through a washer 76 into a threaded hole 14b defined in an axial center portion of a free end of the stem portion 14. The washer 76 is fixed to the hub axle 2A by bolts 80.

By so connecting, as compared with the connecting system in which the outer race 13a is coupled with the hub axle 2A by a nut as shown in the embodiment of FIG. 14, a phase difference between the inner race 2B and the outer race 13a can easily occur when the load acts on the wheel support bearing assembly 10 and, therefore, the load detecting sensitivity can be increased.

Figure 17:
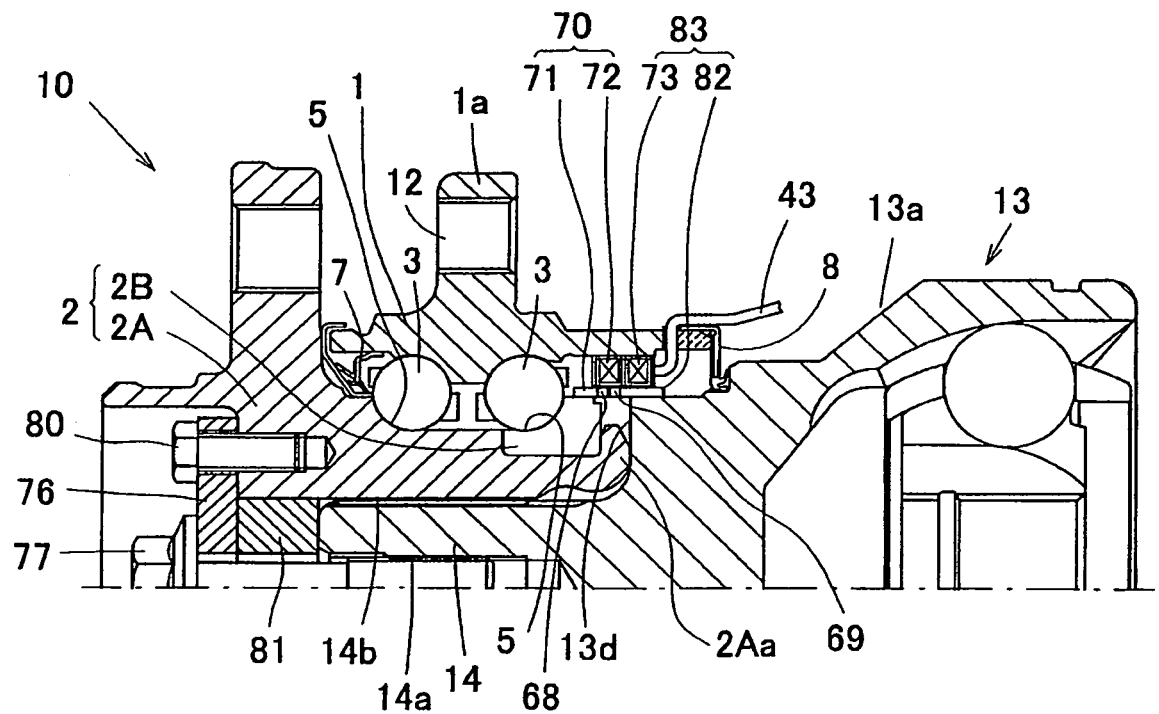
FIG. 17 is a sectional view of the wheel support bearing assembly with the built-in load sensor according to a seventh preferred embodiment of the present invention.

FIG. 17 illustrates a seventh preferred embodiment of the present invention. This seventh embodiment differs from the sixth embodiment shown in FIG. 16 in that the inner race 2B is axially fastened and fixed to the hub axle 2A by the staked portion 2Aa. In this seventh embodiment, since the inner race 2B is axially fastened and fixed by the staked portion 2Aa, there is no possibility that a preload of the wheel support bearing assembly 10 may drop out even though an end face 13d of the outer race 13a of the constant velocity universal joint 13 and the staked portion 2Aa are not contacted with each other or fastened together by a nut. For this reason, the end face 13d of the outer race 13a and the staked portion 2Aa are arranged without being contacted with each other or contacted under a light pressure.

The washer 76 is fixed to the hub axle 2A by means of a plurality of bolts 80 and, while a spacer 81 is disposed between the stem portion 14 and the washer 76, the outer race 13a of the constant velocity universal joint 13 is axially immovably fixed by fastening the bolt 77. The spacer 81 has a thickness that is so chosen as to form a gap between the end face 13d of the outer race 13a and the staked portion 2Aa. Ring members 71 and 82, each having indentations defined therein, are press-fitted onto the inner race 2B and the outer race 13a. The indentations of the ring member 71 and the indentations of the ring member 82 are arranged in substantially 90° offset phase relation to each other. Those indentations are provided in a manner similar to, and are provided in the same relationship with, the indentations 68 and 69 shown in and described with reference to FIG. 15. By arranging those indentations in the 90° offset phase relation to each other, the rotational torque in forward and reverse directions can be detected. A portion of the ring 82, where no indentation is formed, and the detecting part 73 altogether form a temperature compensator 83. In this seventh embodiment, since no contact occurs between the end face 13d of the outer race 13a and the inner race 2B by the use of the bolt 77, the phase difference can easily be produced as compared with the fifth embodiment shown in and described with reference to FIG. 14 and, hence, increase of the sensitivity and reduction of the hysteresis can be expected.

Figure 18:
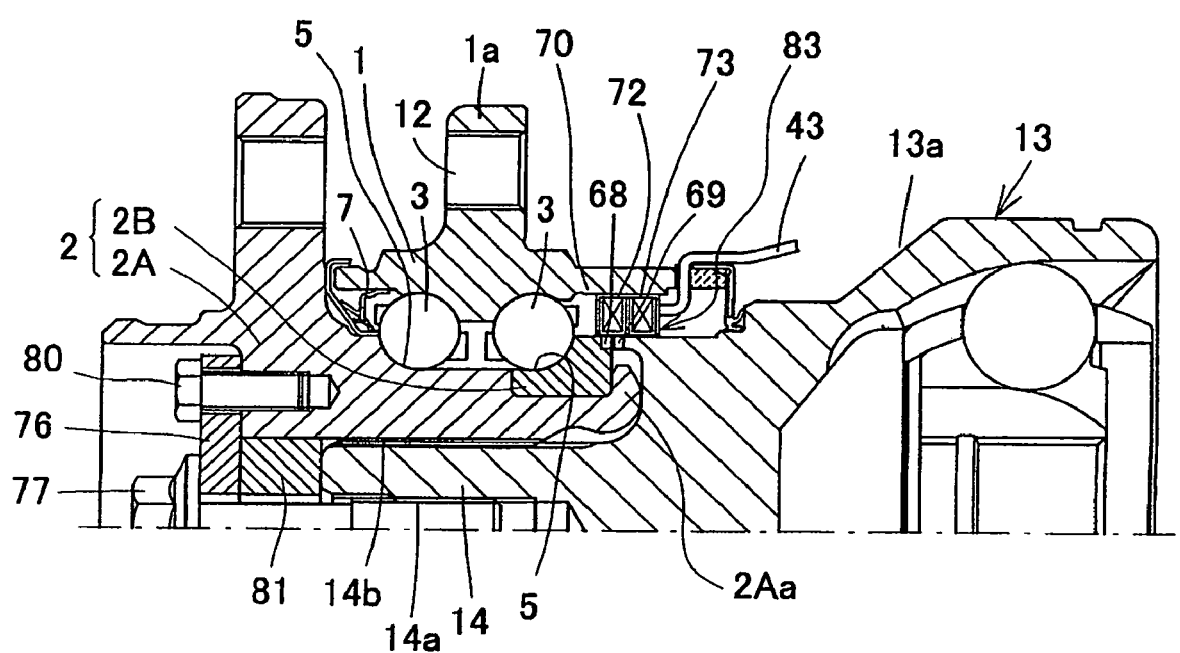
FIG. 18 is a sectional view of the wheel support bearing assembly with the built-in load sensor according to an eighth preferred embodiment of the present invention.

FIG. 18 illustrates an eighth preferred embodiment of the present invention. This eighth embodiment differs from the seventh embodiment in that the indentations 68 and 69 shown in FIG. 15 are provided directly in the inner race 2B and the outer race 13a, respectively. Other structural features of the eighth embodiment are identical with those of the seventh embodiment shown in and described with reference to FIG. 17. The connecting structure shown in FIGS. 17 and 18 for connecting the outer race 13a of the constant velocity universal joint 13 and the wheel support bearing assembly can be applied the first and second embodiments shown in FIGS. 1 and 5.

In the wheel support bearing assembly 10 with the built-in load sensor according to any one of the foregoing various embodiments, since the system capable of detecting the relative phase difference between the inner race 2B and the outer race 13a is employed, it is possible to minimize an influence on the torque output, which results from the loosening of the spline connection between the hub axle and the constant velocity universal joint and/or the inclination of the splines at an angle of a few degree to reduce the loosening of the spline connection. For this reason, with the first to eighth embodiments of the present invention, the linearity of the sensor output can be secured even if the torque in a direction counter to the direction in which the splines are inclined is to be transmitted. If the sensor sensitivity decreases in the direction of torsion of the wheel support bearing assembly 10, correction may be made within an electronic control unit (ECU). Also, it is possible to reduce the hysteresis of the sensor output if the contact pressure between the end face of the outer race of the constant velocity universal joint and the staked portion of the hub axle of the inner member is minimized or a gap is provided therebetween.

The torque output so obtained is captured as information in the ECU and can be applied for the control of the automobile traveling stability and/or for the transmission of road surface information in the steer-by-wire system.

What is claimed is:

1. A wheel support bearing assembly with a built-in load sensor, which assembly is operable to support a wheel rotatably relative to a vehicle body and comprises:
    an outer member having an inner peripheral surface formed with double rows of raceway surfaces;
    an inner member having an outer peripheral surface formed with double rows of raceway surfaces in face-to-face relation with the double rows of the raceway surfaces of the outer member;
    double rows of rolling elements interposed between those raceway surfaces of the outer member and the inner member;
    a first angle detecting sensor including a to-be-detected part provided in the inner member and a corresponding detecting part provided in the outer member in face-to-face relation with the to-be-detected part provided in the inner member;
    a second angle detecting sensor including a to-be-detected part provided in an outer race of a constant velocity universal joint that is coupled with the inner member, and a corresponding detecting part provided in the outer race in face-to-face relation with the to-be-detected part provided in the outer race; and
    a load conversion unit for comparing respective detection signals from the detecting parts of the first and second angle detecting sensors to detect a relative angular difference between the inner member and the constant velocity universal joint to thereby detect a load acting on the wheel support bearing assembly.

2. The wheel support bearing assembly with the built-in load sensor as claimed in claim 1, wherein each of the first and second angle detecting sensors is a wound-type sensor in which the detecting part has a coil winding and the to-be-detected part is made of a magnetic member having a plurality of circumferentially arranged indentations.

3. The wheel support bearing assembly with the built-in load sensor as claimed in claim 1, wherein each of the detecting parts of the first and second angle detecting sensors is a magnetic sensor capable of providing an analog output, and each of the to-be-detected parts of the first and second angle detecting sensors is a magnetic encoder magnetized to have alternating N and S poles.

4. The wheel support bearing assembly with the built-in load sensor as claimed in claim 1, wherein one of the first and second angle detecting sensors is used to output a signal for controlling an anti-lock brake system.

5. The bearing assembly for the wheel with the built-in load sensor as claimed in claim 1, wherein each of the to-be-detected parts includes a ring having a row of windows cyclically defined therein and wherein the rings of the to-be-detected parts are spaced a predetermined gap therebetween in a radial direction and arranged in such a manner that the windows of the rings do not overlap with each other and wherein each of the detecting parts includes a coil winding.

6. The wheel support bearing assembly with the built-in load sensor as claimed in claim 5, wherein each of the rings has two rows of the windows and wherein the rings are so arranged that an area of opening of the windows of one row becomes small while an area of opening of the windows of the other row becomes large when a torque is applied to the wheel support bearing assembly, and wherein the load conversion unit detects the load by calculating a differential output of respective changes in magnetic resistances of the rings detected by the corresponding detecting parts.

7. The wheel support bearing assembly with the built-in load sensor as claimed in claim 5, wherein in place of the ring a plurality of indentations are formed as the to-be-detected part directly in a surface of one of the inner member and the outer race of the constant velocity universal joint, whereas the ring having the windows is secured to a surface of the other of the inner member and the outer race.

8. The wheel support bearing assembly with the built-in load sensor as claimed in claim 1, wherein respective portions of the inner member and the outer race which contact with each other have the same outer diameter and wherein a plurality of indentations defining the to-be-detected part are provided in each of the contact portions and wherein the indentations on the inner member and the indentations on the outer race contact with each other while aligned out of phase with each other and wherein one of the detecting parts of the first and second angle detecting sensors provided in the outer member includes a coil winding in face-to-face relation with the indentations on the inner member and the outer race, and wherein one of the first and second angle detecting sensors which includes the detecting part having the coil winding detects a change in relative phase between the indentations on the inner member and the indentations on the outer race as a change in magnetic resistance of the coil winding of the corresponding detecting part when a torque is applied to the wheel support bearing assembly.

9. The wheel support bearing assembly with the built-in load sensor as claimed in claim 8, wherein a coil winding is additionally provided as the other of the detecting parts in the outer member so as to confront with a rotating portion of the outer race, where no indentation is formed, and wherein a differential output of respective changes in magnetic resistances of those coil windings forming the detecting parts is detected.

10. The wheel support bearing assembly with the built-in load sensor as claimed in claim 8, wherein the inner member includes a hub axle having a wheel mounting flange and an inner race mounted on an outer peripheral surface of the hub axle and wherein the inner race is axially fixed to the hub axle by a staked portion provided in an inboard end portion of the hub axle, and wherein ring members, each having indentations arranged circumferentially thereof at one face thereof, are secured respectively to the inner race and the outer race of the constant velocity universal joint with the indentations of the ring members opposed to each other, or circumferentially arranged indentations are formed directly in each of the inner race and the outer race with those indentations of the inner race and the outer race opposed to each other, and wherein an end face of the outer race of the constant velocity universal joint and the staked portion in the hub axle lightly contact with each other under slight pressure or a gap is provided between the end face of the outer race and the staked portion.

11. The wheel support bearing assembly with the built-in load sensor as claimed in claim 10, wherein a spacer is arranged between a free end of a stem portion of the outer race of the constant velocity universal joint and a washer secured to the outboard side of the hub axle and wherein the outer race and the hub axle are bolted together through a threaded hole defined in a free end face of the stem portion with the washer and the spacer intervened and wherein a gap is provided between the staked portion and the end face of the outer race.

12. The wheel support bearing assembly with the built-in load sensor as claimed in claim 1, wherein a stem portion of the outer race has a length smaller than an outboard end of a center bore of the inner member in which the stem portion of the outer race engages, and wherein a threaded hole is defined in a free end face of the stem portion and, by threading a bolt into the threaded hole through a washer contacting a portion of the inner member around the threaded hole, the stem portion of the outer race and the inner member are connected together.

13. The wheel support bearing assembly with the built-in load sensor as claimed in claim 1, wherein a stem portion of the outer race has a length smaller than an outboard end of a center bore of the inner member in which the stem portion of the outer race engages and wherein a threaded hole is defined in a free end face of the stem portion and, by threading a bolt into the threaded hole while a cylindrical flange of a cylindrically flanged washer is inserted into the center bore of the inner member with its free end held in contact with a free end of the stem portion, the stem portion of the outer race and the inner member are connected together.

* * * * *